US007827395B2

(12) United States Patent
Suzuki et al.

(10) Patent No.: US 7,827,395 B2
(45) Date of Patent: Nov. 2, 2010

(54) UPDATE-STARTUP APPARATUS AND UPDATE-STARTUP CONTROL METHOD

(75) Inventors: Takashi Suzuki, Yokohama (JP); Ken Ohta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 798 days.

(21) Appl. No.: 11/673,797

(22) Filed: Feb. 12, 2007

(65) Prior Publication Data

US 2007/0220242 A1    Sep. 20, 2007

(30) Foreign Application Priority Data

Feb. 13, 2006    (JP)    ............................. P2006-035241

(51) Int. Cl.
 *G06F 9/24* (2006.01)
 *G06F 15/177* (2006.01)
 *G06F 9/44* (2006.01)
 *G06F 9/445* (2006.01)
(52) U.S. Cl. ............................. 713/1; 713/2; 717/171; 717/176
(58) Field of Classification Search .................... 713/1, 713/2; 717/171, 176
 See application file for complete search history.

(56) References Cited

U.S. PATENT DOCUMENTS

| | | | |
|---|---|---|---|
| 5,995,745 A | 11/1999 | Yodaiken | |
| 6,553,490 B1 | 4/2003 | Kottapurath et al. | |
| 6,832,373 B2 | 12/2004 | O'Neill | |
| 7,502,674 B2* | 3/2009 | Okude et al. | 701/36 |
| 2002/0152305 A1* | 10/2002 | Jackson et al. | 709/224 |
| 2003/0070162 A1 | 4/2003 | Oshima et al. | |
| 2003/0084206 A1* | 5/2003 | Floman et al. | 710/1 |
| 2004/0199632 A1* | 10/2004 | Romero et al. | 709/226 |
| 2004/0205755 A1 | 10/2004 | Lescouet et al. | |
| 2004/0210890 A1* | 10/2004 | Armstrong et al. | 717/168 |
| 2005/0033908 A1 | 2/2005 | Chong et al. | |
| 2005/0076326 A1* | 4/2005 | McMillan et al. | 717/100 |
| 2005/0235278 A1* | 10/2005 | Wu et al. | 717/168 |
| 2006/0020943 A1* | 1/2006 | Boutcher et al. | 718/104 |

* cited by examiner

*Primary Examiner*—Vincent T Tran
(74) *Attorney, Agent, or Firm*—Oblon, Spivak, McClelland, Maier & Neustadt, L.L.P.

(57) ABSTRACT

An update-startup apparatus includes: an OS startup processor unit configured to start a first OS and a second OS; an initial startup processor unit configured to start the OS startup processor unit; and an update information storage unit configured to store first OS update information for updating a first OS program constituting the first OS and second OS update information for updating a second OS program constituting the second OS. The OS startup processor unit starts the first OS after updating the first OS program by using the first OS update information, when the first OS update information is stored at a time of power-on or at a time of rebooting the first OS; the OS startup processor unit starts the first OS, when the first OS update information is not stored at a time of power-on; and the OS startup processor unit cancels a reboot of the second OS, when the second OS update information is not stored at a time of rebooting the first OS.

10 Claims, 12 Drawing Sheets

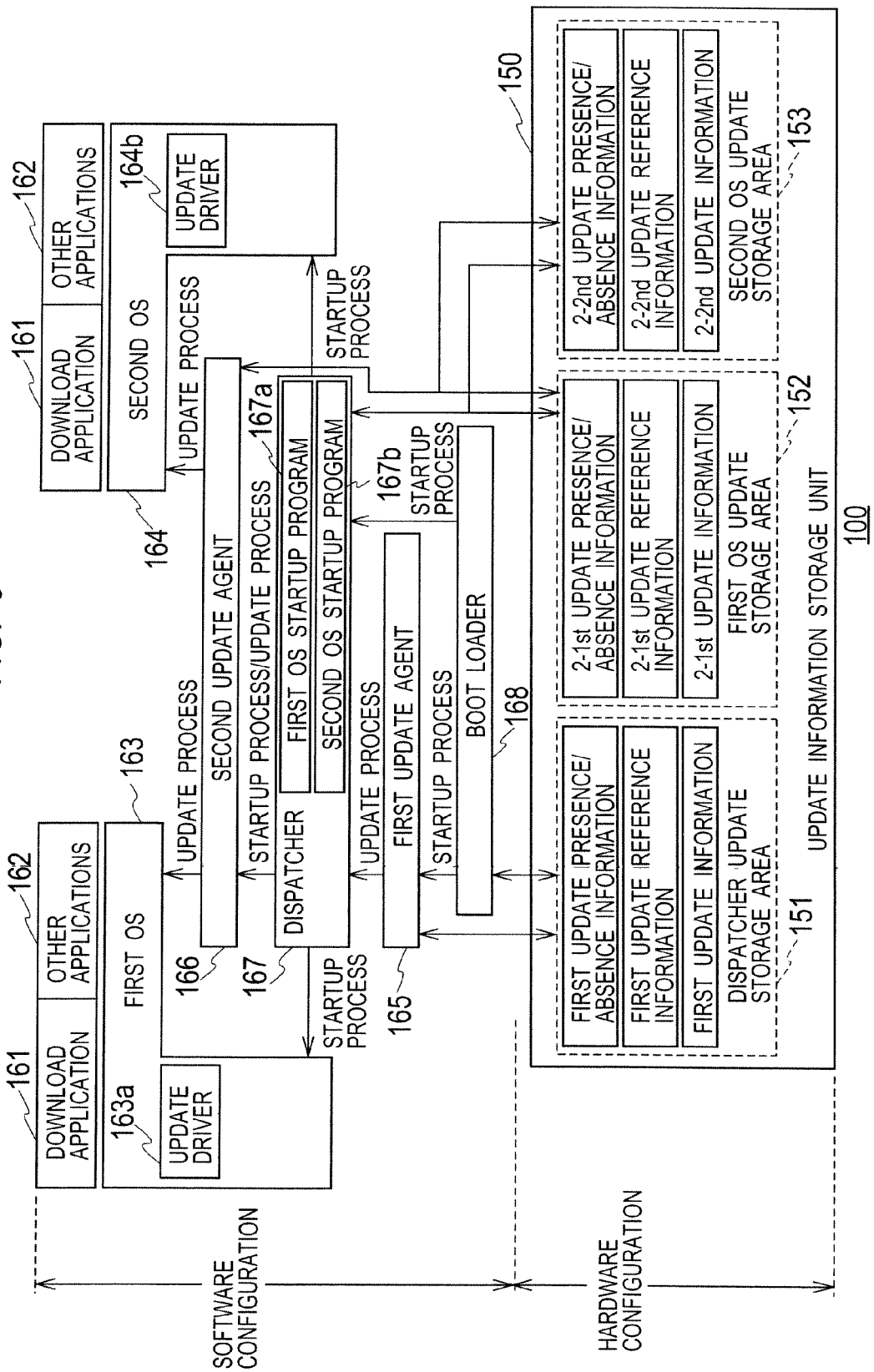

UPDATE-STARTUP APPARATUS AND UPDATE-STARTUP CONTROL METHOD

CROSS REFERENCE TO RELATED APPLICATION

This application is based upon and claims the benefit of priority from the prior Japanese Patent Application No. P2006-035241, filed on Feb. 13, 2006; the entire contents of which are incorporated herein by reference.

BACKGROUND OF THE INVENTION

1. Field of the Invention

The present invention relates to an update-startup apparatus and an update-startup control method which update a program constituting an operating system (hereinafter, referred to as an OS), and which then starts the OS.

2. Description of the Related Art

Heretofore, a computer, such as a mobile telephone or a PDA (Personal Digital Assistant), obtains update information including an update program via a network, in response to an input operation by a user.

Here, the update program is the one in which a bug in a program constituting an OS or the like is fixed.

Then, the computer updates the program having the bug by using this update information.

In addition, a computer allowing a plurality of OSs to be executed has been provided. Examples of a combination of the plurality of OSs executed on the computer include: a combination of a real-time OS for executing real-time control, and a general-purpose OS such as Linux (trademark), Windows (trademark) or the like, which is widely used; and a combination of a Trusted OS for executing a process at a certain level of reliability and an Untrusted OS for executing a process at a lower level of reliability than that handled by the Trusted OS.

The computer can execute not only a process of starting all the OSs (an all-OS-startup process), but also a process of starting one of OSs (a single-OS-startup process).

For example, in a case where a computer has a trouble only in a second OS while operating on a first OS and the second OS, the computer can reboot only the second OS.

Here, the following combinations of the above processes can be considered.

A first one is a combination of the program update process and the all-OS-startup process (a combined process 1), and a second one is a combination of the program update process and the single-OS-startup process (a combined process 2).

Hereinafter, descriptions will be given of problems which occur when the combined processes 1 and 2 are executed.

FIG. 9 is a software configuration diagram of a computer at the time when the combined processes 1 and 2 are used. FIG. 10 is a flowchart showing a process operation of the computer at the time when the combined processes 1 and 2 are used.

As shown in FIG. 9, the computer includes a boot program 11, an update agent 12, a dispatcher 13 and an update information storage unit 20.

The update agent 12 is configured to update an OS program constituting a first OS 14 or a second OS 15 in response to an instruction from the boot program 11.

The dispatcher 13 is configured to reboot the first OS 14 or the second OS 15 in response to an instruction from the boot program 11.

The update information storage unit 20 is configured to store downloaded update information.

Note that the boot program 11 and the update agent 12 are configured to execute the program update process. The dispatcher 13 is configured to execute the all-OS-startup process and the single-OS-startup process.

As shown in FIG. 10, in step S1, the boot program 11 is started at startup of the computer (at power-on or at reboot).

If "presence information" indicating that update information exists is stored in the update information storage unit 20 in step S3, the boot program 11 starts the update agent 12.

In step S5, the update agent 12 executes an update of dispatcher 13 or one of the OSs by using the update information, and deletes the "presence information".

If the "presence information" is not stored in the update information storage unit 20, the boot program 11 starts the dispatcher 13 in step S9.

In steps S11 and S13, the dispatcher 13 allocates memory areas for the first OS 14 and the second OS 15, and starts the first OS 14 and the second OS 15.

The process up to this point falls under the category of the combined process 1.

Alternatively, the dispatcher 13 can start any one of the OSs instead of all of the OSs. The process up to this point falls under the category of the combined process 2.

However, in a case where the combined process 1 is executed, not only an OS related to an update but also an OS not related to an update are rebooted (steps S9 to S13).

For this reason, the computer cannot reboot only the OS related to the update while allowing the OS not related to the update to keep running. It results in increasing downtime of the operating rate of the OS not related to the update.

In contrast, in a case where the combined process 2 is executed, it is possible to reboot only the OS related to the update, and thereby to solve the problem of the combined process 1. However, the following problem occurs.

To be more precise, in a case where there is not update information for updating a program constituting the first OS 14 but where there exists update information for updating a program constituting the second OS 15 when power is turned on, the program update process (steps S1 to S7 shown in FIG. 10) is inevitably executed. Thereafter, the single-OS-startup process is executed.

For this reason, even though power is turned on, the first OS 14 not related to the update is not started until the program update process ends.

For this reason, in a case where power is turned on, the computer cannot promptly start an OS not related to the update. As a result, the operating rate of the OS cannot be enhanced.

BRIEF SUMMARY OF THE INVENTION

The present invention has been made in consideration of the aforementioned background. An object of the present invention is to provide an update-startup apparatus and an update-startup control method which are capable of rebooting only an OS related to an update among a plurality of OSs, and which are capable of promptly starting an OS not related to an update when power is turned on.

A first aspect of the present invention is summarized as an update-startup apparatus including: an OS startup processor unit configured to start a first OS and a second OS; an initial startup processor unit configured to start the OS startup processor unit; and an update information storage unit configured to store first OS update information for updating a first OS program constituting the first OS and second OS update information for updating a second OS program constituting the second OS; wherein, the OS startup processor unit is configured to start the first OS after updating the first OS program by using the first OS update information, when the first OS update information is stored at a time of power-on or at a time of rebooting the first OS; the OS startup processor unit is configured to start the first OS, when the first OS update information is not stored at a time of power-on; and the OS startup processor unit is configured to cancel a reboot of the second OS, when the second OS update information is not stored at a time of rebooting the first OS.

In the first aspect, the update information storage unit can be configured to store update cancellation information for canceling an update of the first OS program when an update of a startup program constituting the OS startup processor unit is not completed; the OS startup processor unit can be configured to update the first OS program by using the first OS update information, when the update cancellation information is not stored at the time of power-on or at the time of rebooting the first OS; and the OS startup processor unit can be configured to cancel an update of the first OS program, when the update cancellation information is stored at the time of power-on or at the time of rebooting the first OS.

In the first aspect, the update information storage unit can be configured to store update cancellation information for canceling an update of a second OS program when an update of the first OS program is not completed; the OS startup processor unit can be configured to update the second OS program by using the OS update information, when the update cancellation information is not stored at the time of power-on or at a time of rebooting the second OS; and the OS startup processor unit can be configured to cancel an update of the second OS program, when the update cancellation information is stored at the time of power-on or at a time of rebooting the second OS.

In the first aspect, the OS startup processor unit can be configured to delete the update cancellation information, when the startup program is updated.

In the first aspect, the OS startup processor unit can be configured to delete the update cancellation information, when the first OS program is updated.

In the first aspect, the update information storage unit can be configured to store startup update information for updating a startup program constituting the OS startup processor unit; the initial startup processor unit can be configured to update the startup program by using the startup update information, when the startup update information is stored at the time of power-on or at the time of rebooting the first OS or the second OS; and the initial startup processor unit can be configured to start the OS startup processor unit, when the startup update information is not stored at the time of power-on or at the time of rebooting the first OS or the second OS.

In the first aspect, the update information storage unit can be configured to store startup disabling information for canceling a startup of the second OS when an update of the first OS program is not completed; the OS startup processor unit can be configured to start the second OS, when the startup disabling information is not stored at the time of power-on or at a time of the second OS; and the OS startup processor unit can be configured to cancel a startup of the second OS, when the startup disabling information is stored at the time of power-on or before the second OS is rebooted.

In the first aspect, the OS startup processor unit can be configured to delete the startup disabling information, when the first OS program is updated.

A second aspect of the present invention is summarized as an update-startup control method, including: (A) starting a first OS and a second OS; (B) starting the step (A); and (C) storing first OS update information for updating a first OS program constituting the first OS and second OS update information for updating a second OS program constituting the second OS; wherein, in the step (A), the first OS is started after the first OS program is updated by using the first OS update information, when the first OS update information is stored at a time of power-on or at a time of rebooting the first OS; in the step (A), the first OS is started, when the first OS update information is not stored at a time of power-on; and in the step (A), a reboot of the second OS is cancelled, when the second OS update information is not stored at a time of rebooting the first OS.

BRIEF DESCRIPTION OF THE SEVERAL VIEWS OF THE DRAWINGS

FIG. 3 is a diagram showing a control program structure and a hardware configuration in the first embodiment.

DETAILED DESCRIPTION OF THE INVENTION

First Embodiment (Computer Configuration)

Figure 1:
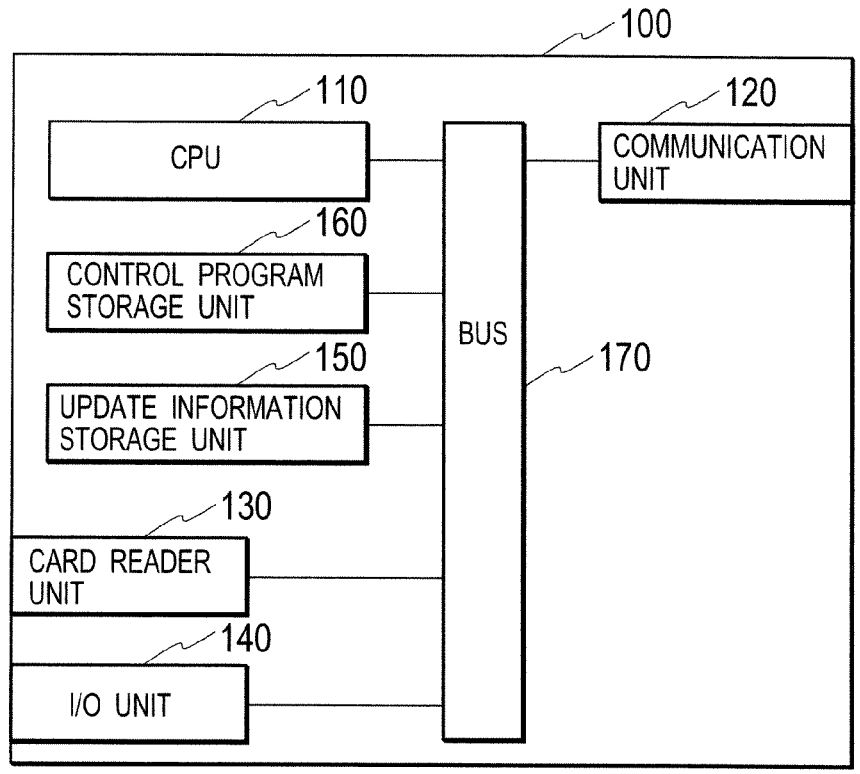
FIG. 1 is a diagram showing an internal configuration of a computer in a first embodiment.

FIG. 1 is a schematic diagram of a configuration of a computer 100 in this embodiment. As shown in FIG. 1, the computer 100 includes a CPU 110, a communication unit 120, a card reader unit 130, an I/O unit 140, an update information storage unit 150 and a control program storage unit 160.

The CPU 110 is configured to execute a relevant process according to a program stored in the control program storage unit 160.

The communication unit 120 is configured to download predetermined information (update information or the like) from an external apparatus (not illustrated), and to store the downloaded predetermined information in the update information storage unit 150 (refer to FIG. 3).

The card reader unit 130 is configured to read information on a subscriber identification stored in a SIM card, and information stored in other cards.

The I/O unit 140 is configured to input and output information such as letters, symbols, numerals and images.

The update information storage unit 150 is configured to include a dispatcher update storage area 151, a first OS update storage area 152 and a second OS update storage area 153 (refer to FIG. 3).

It is needless to say that the number of the update storage areas for OSs is not limited to two, that is, the update storage area 152 and the second OS update storage area 153, and that it is possible to increase the number of the update storage areas with an increase of the number of OSs.

The dispatcher update storage area 151 is an area for storing first update presence/absence information, first update reference information and first update information (startup-update information).

The first update presence/absence information includes "presence information" indicating that the first update information exists.

The first update reference information includes information on an address of an area where the first update information is stored.

The first update information includes an update program for updating a part of or the whole of a program (a startup program) constituting a dispatcher 167.

The first OS update storage area 152 is an area for storing first one of second update presence/absence information (hereinafter, referred to "2-1st update presence/absence information"), 2-1st update reference information and 2-1st update information (OS update information).

The 2-1st update presence/absence information includes the "presence information" indicating that the 2-1st update information exists.

The 2-1st update reference information includes information of an address of an area where the 2-1st update information is stored.

The 2-1st update information includes an update program for updating a part of or the whole of a first OS program constituting a first OS 163.

The second OS update storage area 153 is an area for storing second one of second update presence/absence information (hereinafter, referred to "2-2nd update presence/absence information"), 2-2nd update reference information and 2-2nd update information (OS update information).

The 2-2nd update presence/absence information includes "presence information" indicating that the 2-2nd update information exists.

The 2-2nd update reference information includes information on an address of an area where the 2-2nd update information is stored.

The 2-2nd update information includes an update program for updating a part of or the whole of a second OS program constituting a second OS 164.

Note that the update program is not limited to a program for an entire update of an OS program in a state before update, but may be a program for a differential update of an OS program in a state before update. By using such a program, the data amount of update information can be further reduced.

The control program storage unit 160 is configured to store a control program (software).

Figure 2:
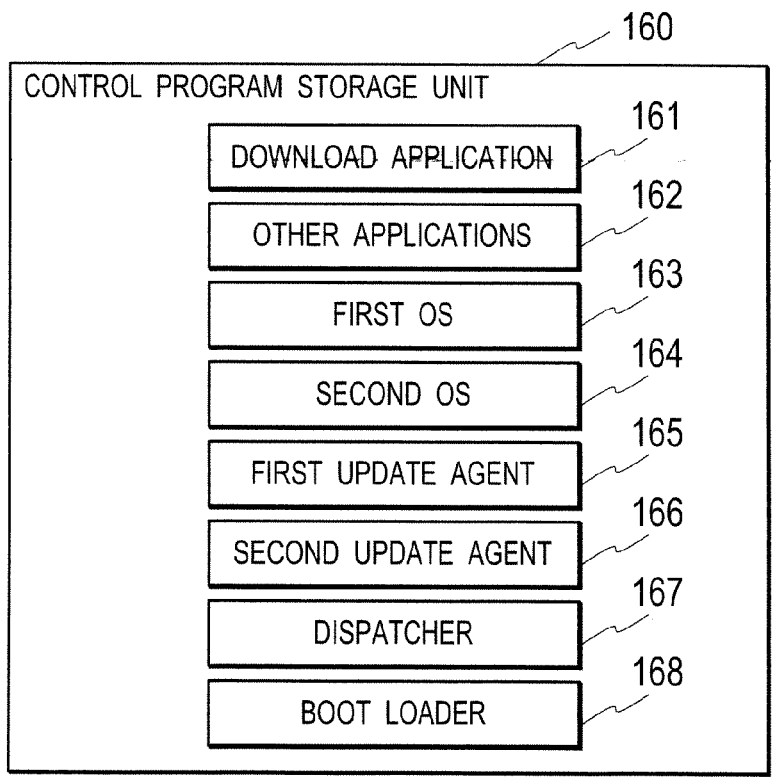
FIG. 2 is a diagram showing contents of a control program in the first embodiment.

FIG. 2 is a diagram showing contents of the control program in this embodiment. FIG. 3 is a diagram showing a control program configuration (a software configuration) executed by the CPU 110, and a hardware configuration accessed by means of the control program configuration.

As shown in FIG. 2, the control program includes a download application 161, other applications 162, the first OS 163, the second OS 164, a first update agent 165, a second update agent 166, the dispatcher 167 and a boot loader 168.

The download application 161 is a program running on the first OS 163 and the second OS 164. The download application 161 is configured to download update information (here, for example, first update information, 2-1st update information, or 2-2nd update information) from an external apparatus (not illustrated) through an update driver 163a or an update driver 164b.

The update driver 163a and the update driver 164b are configured to generate update presence/absence information (here, the first update presence/absence information, the 2-1st update presence/absence information, or the 2-2nd update presence/absence information) and update reference information (here, the first update reference information, the 2-1st update reference information, or the 2-2nd update reference information) on the basis of the downloaded update information.

The other applications 162 are applications other than the download application 161. The first update agent 165 is configured to update a part of or the whole of the startup program constituting the dispatcher 167 by using the stored first update information.

The second update agent 166 is configured to update a part of or the whole of the first OS program constituting the first OS 163 by using the 2-1st update information for the first OS 163.

The second update agent 166 is configured to update a part of or the whole of the second OS program constituting the second OS 164 by using the 2-2nd update information for the second OS 164.

The operation of the dispatcher 167 includes: (1) loading and starting the first OS 163 or the second OS 164; (2) allocating a memory area and other system resources to the first OS 163 or the second OS 164; (3) allocating a time to each task of the first OS 163 or the second OS 164 executed by the CPU 110 (a scheduling function); and (4) executing processes for communications between the OSs.

In addition, the dispatcher 167 includes a first OS startup program 167a and a second OS startup program 167b.

The first OS startup program 167a is configured to start the second update agent 166, in a case where the 2-1st update information for the first OS 163 is stored at power-on or at reboot of an OS (the first OS 163 or the second OS 164).

In contrast, the first OS startup program 167a is configured to start the first OS 163, in a case where the 2-1st update information for the first OS 163 is not stored at power-on.

In a case where the 2-1st update information for the first OS 163 is not stored at reboot of the second OS 164, the first OS startup program 167a is configured to cause a reboot of the first OS 163 to be cancelled (to cause the first OS 163 to continue processes).

Specifically, in a case where "presence information" is included in the 2-1st update presence/absence information at power-on, or at reboot of an OS (the first OS 163 or the second OS 164), the first OS startup program 167a is configured to start the second update agent 166 for the purpose of updating the first OS program constituting the first OS 163.

In contrast, in a case where the "presence information" is not included in 2-1st update presence/absence information at power-on, the first OS startup program 167a is configured to start the first OS 163.

In addition, the first OS startup program 167a is configured to cancel a reboot of the first OS 163 in a case where the "presence information" is not included in 2-1st update presence/absence information at reboot of the second OS 164.

The second OS startup program 167b is configured to start the second update agent 166, in a case where the 2-2nd update information for the second OS 164 is stored at power-on or at reboot of an OS (the first OS 163 or the second OS 164).

In contrast, the second OS startup program 167b is configured to start the second OS 163, in a case where the 2-2nd update information for the second OS 164 is not stored at power-on.

In addition, in a case where the 2-2nd update information for the second OS 164 is not stored at reboot of the first OS 163, the second OS startup program 167b is configured to cause a reboot of the second OS 164 to be cancelled (to cause the second OS 164 to continue processes).

Specifically, in a case where "presence information" is included in 2-2nd update presence/absence information at power-on, or at reboot of an OS (the first OS 163 or the second OS 164), the second OS startup program 167b is configured to start the second update agent 166 for the purpose of updating the second OS program constituting the second OS 166.

In contrast, in a case where the "presence information" is not included in 2-2nd update presence/absence information at power-on, the second OS startup program 167b is configured to start the second OS 164.

In addition, the second OS startup program 167b is configured to cancel a reboot of the second OS 164, in a case where the "presence information" is not included in 2-2nd update presence/absence information at reboot of the first OS 163.

Note that the second update agent 166 and the dispatcher 167 constitute an OS startup processor.

The boot loader 168 is configured to start the first update agent 165 or the dispatcher 167.

To be more precise, the boot loader 168 is configured to start the first update agent 165, in a case where "presence information" is included in the first update presence/absence information at power-on or at reboot.

The boot loader 168 is configured to start the dispatcher 167, in a case where the "presence information" is not included in the first update presence/absence information at power-on or at reboot.

Note that the boot loader 168 constitutes an initial startup processor.

(Operation of Computer)

Hereinafter, descriptions will be given of an operation of the computer 100 in this embodiment by referring to FIG. 4.

Figure 4A:
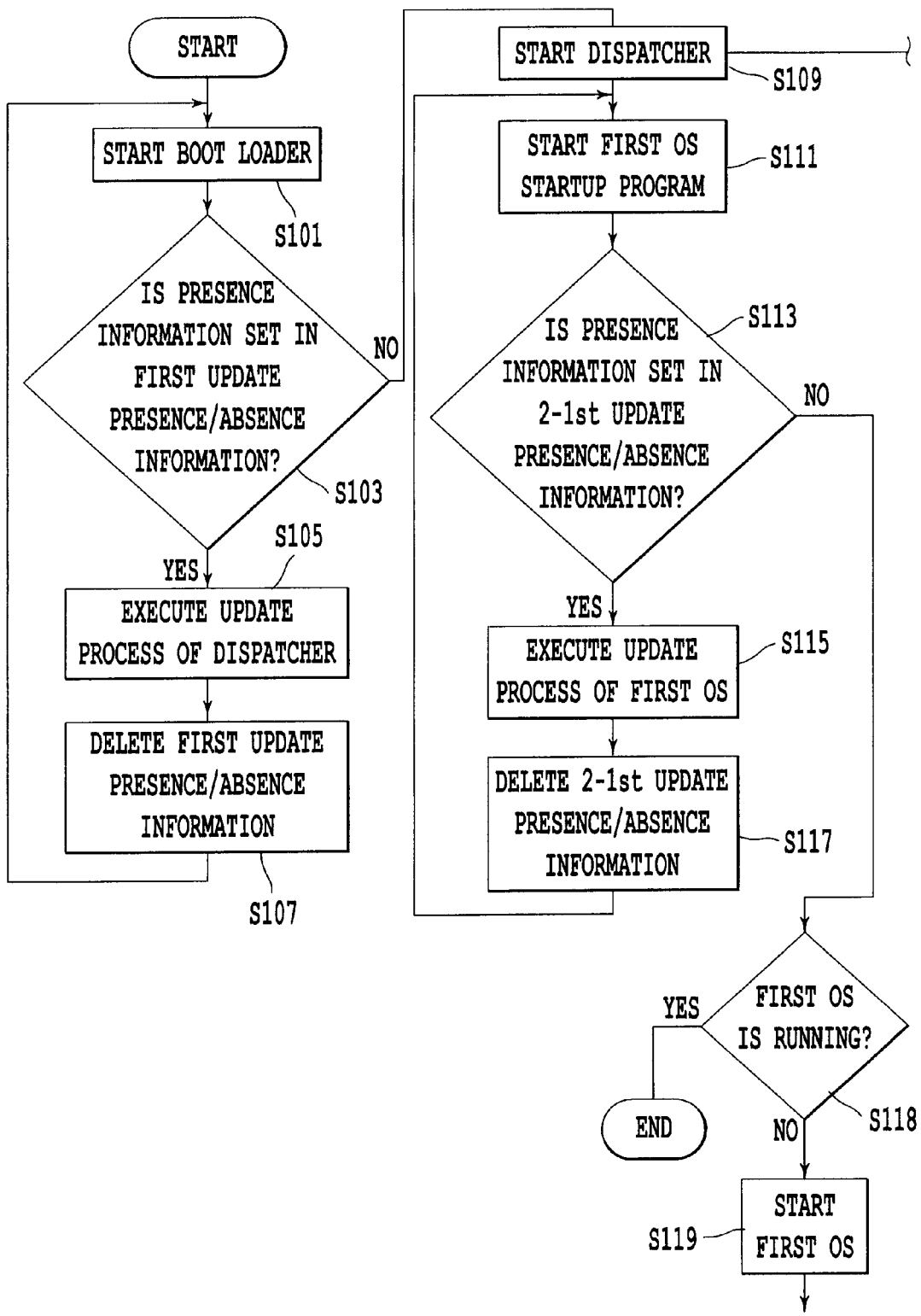
FIG. 4 is flowchart showing an operation of a computer in the first embodiment.
Figure 4B:
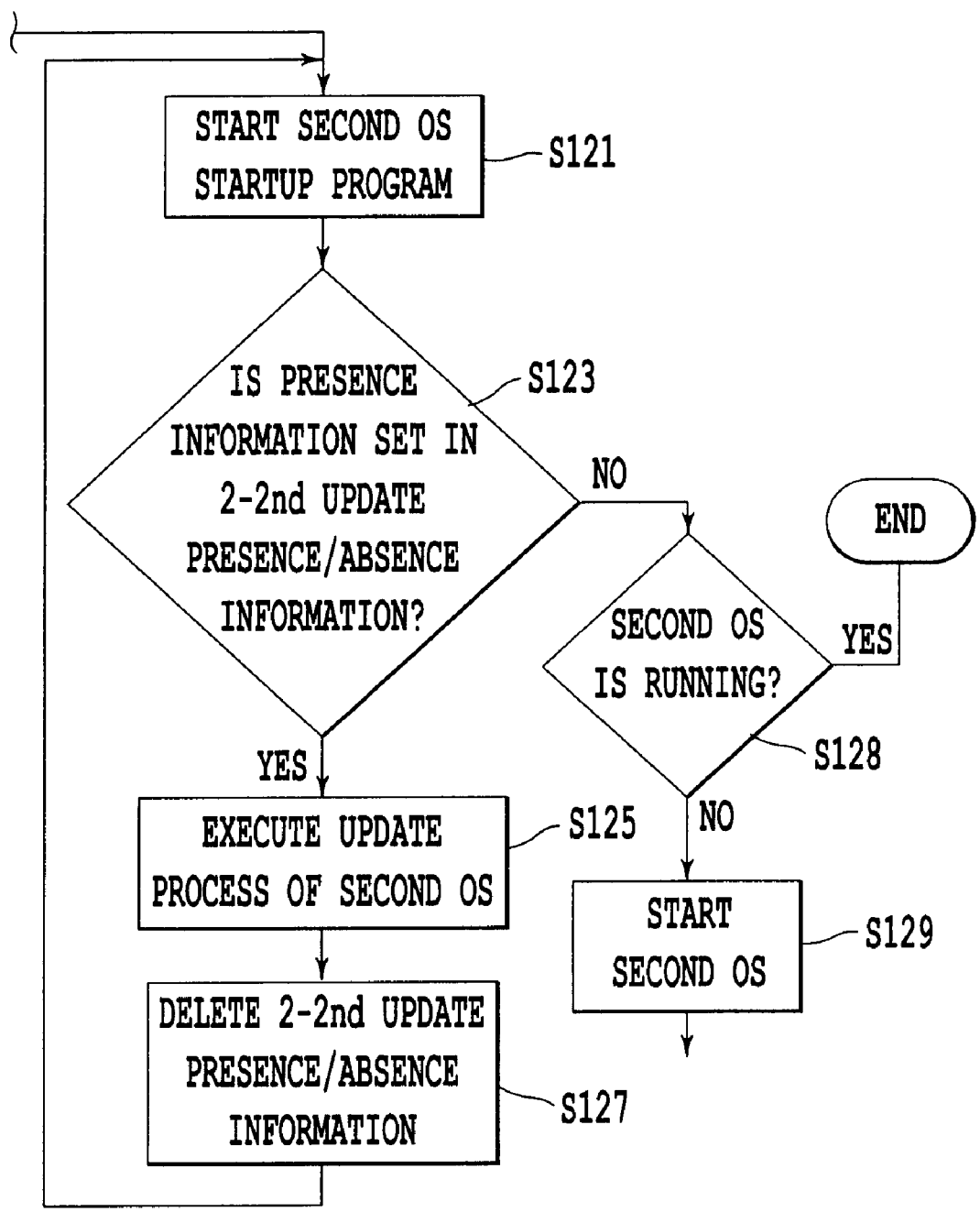

As shown in FIG. 4, in step S101, the boot loader 168 starts at power-on or at reboot.

In step S103, the boot loader 168 determines whether or not the "presence information" is included in the first update presence/absence information.

Then, if YES is determined here, the boot loader 168 starts the first update agent 165, and the process moves to S105. If NO is determined, the process moves to S109.

In step S105, the first update agent 165 obtains the first update information by using the address information included in the first update reference information.

The first update agent 165 updates a part or the whole of the startup program constituting the dispatcher 167 to an update program included in the first update information.

In step S107, the first update agent 165 deletes the first update presence/absence information, the first update reference information and the first update information.

Thereafter, upon completion of the process of step S107, the process is again started from step S101. Then, in step S103, NO is determined because the first update presence/absence information has been deleted.

In step S109, the boot loader 168 starts the dispatcher 167.

In step S111, the dispatcher 167 starts the first OS startup program 167a.

In step S113, the first OS startup program 167a determines whether or not the "presence information" is included in the 2-1st update presence/absence information.

Then, if YES is determined here, the first OS startup program 167a starts the second update agent 166, and the process moves to step S115. If NO is determined, the process moves to step S118.

In step S115, the second update agent 166 obtains the 2-1st update information by using the address information included in the 2-1st update reference information.

The second update agent 166 updates a part or the whole of the first OS program constituting the first OS 163 to an update program included in the 2-1st update information.

In step S117, the second update agent 166 deletes the 2-1st update presence/absence information, the 2-1st update reference information and the 2-1st update information.

Thereafter, upon completion of the process of step S117, the process from S111 is again started. Then, in step S113, NO is determined because the 2-1st update presence/absence information has been deleted. In step S118, it is determined if the first OS is running. If the first OS is not running, in step S119, the first OS is started. If in step S118, it is determined that the first OS is running, the process ends.

In step S119, the first OS startup program 167a allocates a memory area and resources used for execution of the first OS 163, and then starts the first OS 163.

In step S121, the dispatcher 167 starts the second OS startup program 167b.

In step S123, the second OS startup program 167b determines whether or not the "presence information" is included in the 2-2nd update presence/absence information.

Then, if YES is determined here, the second OS startup program 167b starts the second update agent 166, and the process moves to step S125. If NO is determined, the process moves to step S128.

In step S125, the second update agent 166 obtains the 2-2nd update information by using the address information included in the 2-2nd update reference information.

The second update agent 166 updates a part or the whole of the second OS program constituting the second OS 164 to an update program included in the 2-2nd update information.

In step S127, the second update agent 166 deletes the 2-2nd update presence/absence information, the 2-2nd update reference information and the 2-2nd update information.

Thereafter, upon completion of the process of step S127, the process from step S121 is again started. Then, in step S123, NO is determined because the 2-2nd update presence/absence information has been deleted. In step S128, it is determined if the second OS is running. If the second OS is not running, in step S129, the second OS is started. If in step S128, it is determined that the second OS is running, the process ends.

In step S129, the second OS startup program 167b allocates a memory area and resources used for executing the second OS 164, and then starts the second OS 164.

Note that, in a case where all of the tasks running on one of the OSs are currently idle, the dispatcher 167 may execute an update process of an OS program constituting the other OS and a reboot process of the other OS (steps S311 to S323 or steps S325 to S337).

According to the foregoing feature, in a case where OS update information for an OS (for example, the first OS 163) is not stored at reboot of another OS (for example, the second OS 164) (refer to steps S119 or S129), a reboot of the former OS is canceled (that is, the operation of the former OS is caused to continue running).

Thus, the computer 100 is capable of rebooting only an OS related to an update, while allowing an OS not related to an update to continue running. This results in reduction of downtime of the OS not related to the update.

With this configuration, while allowing an OS used for executing an important process such as a telephony function to continue running, the computer 100 can update an OS program constituting another OS used for executing a less important process than the above process, and can reboot the latter OS. As a result, it is possible to prevent a deterioration in a communication service, while executing the update and reboot.

Figure 10:
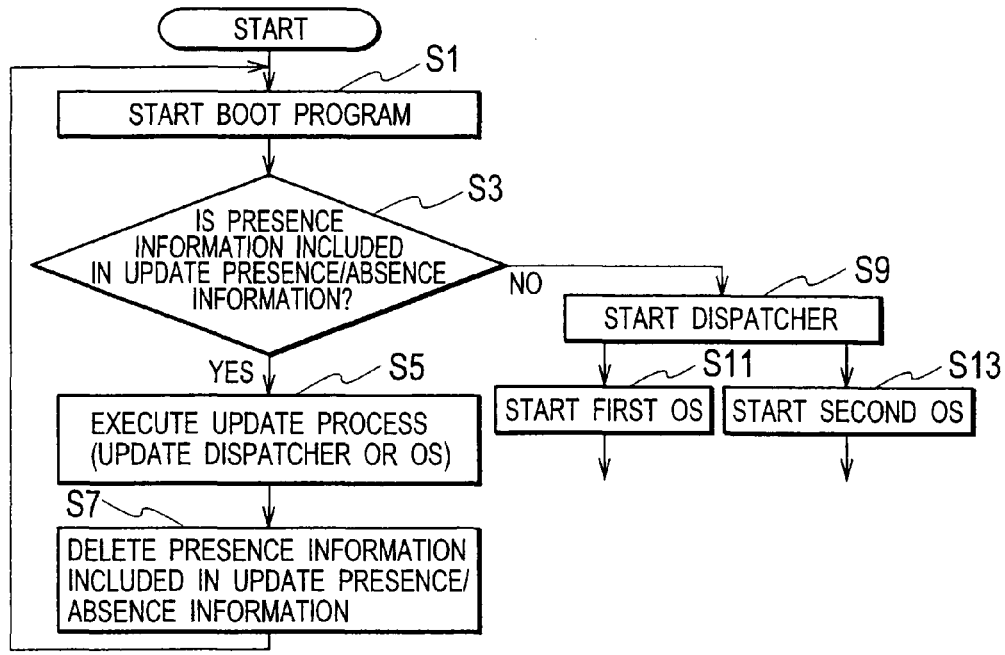
FIG. 10 is a flowchart showing an operation of the computer at the time when the combined process 1 and the combined process 2 are used.

Moreover, at power-on or at reboot of an OS, an OS program is updated not by the boot loader 168 (an initial startup processor unit) but by the dispatcher 167 (an OS startup processor unit) (refer to steps S1 to S7 shown in FIG. 10). In addition, at power-on, an OS not related to an update is started by the dispatcher 167.

In this way, the dispatcher 167 can promptly start an OS not related to the update at power-on, since the boot loader 168 does not execute an update process of an OS program constituting another OS. This results in an improvement in the operating rate of the OS not related to the update.

Second Embodiment (Computer Configuration)

In the first embodiment, one of the plurality of OS programs is updated regardless of whether or not another OS program, or the startup program constituting the dispatcher is updated.

In contrast, in this embodiment, one of the OS programs is updated on condition that another OS program, or the startup program constituting the dispatcher has been updated. Detailed descriptions of this will be given below.

Figure 5:
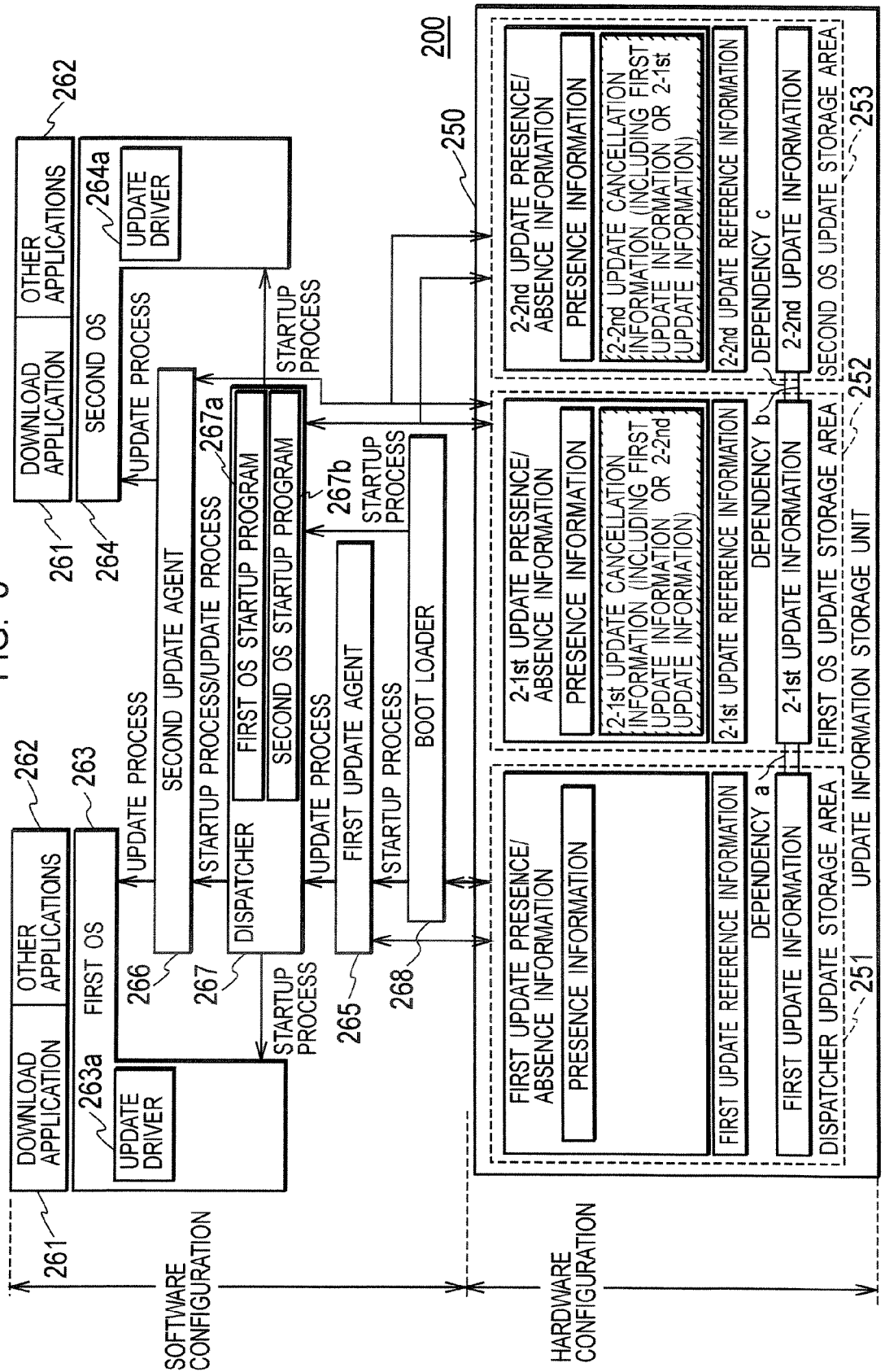
FIG. 5 is a diagram showing a control program configuration and a hardware configuration in a second embodiment.

FIG. 5 is a diagram of an internal configuration of a computer 200 in this embodiment. Shaded areas in FIG. 5 show components not included in the configuration shown in FIG. 3.

As shown in FIG. 5, a first OS update storage area 252 further stores 2-1st update cancellation information.

In addition, a second OS update storage area 253 further stores 2-2nd update cancellation information.

Here, functions except for that of a second update agent 266 in FIG. 5 are substantially the same as those in FIG. 3. For this reason, the following describes only the 2-1st update cancellation information, the 2-2nd update cancellation information, and the second update agent 266.

The 2-1st update cancellation information is update cancellation information used for canceling an update process of a first OS program constituting a first OS 263.

Here, the update process of the first OS is cancelled on condition that an update process of a second OS program constituting a second OS 264 or of a startup program constituting a dispatcher 267 is not completed.

In this embodiment, in a case where an update process of the first OS program is cancelled on condition that an update process of a startup program constituting the dispatcher 267 is not completed (refer to a dependency "a" shown in FIG. 5), "first update information" is included in the 2-1st update cancellation information.

In a case where an update process of the first OS program is cancelled on condition that an update process of the second OS program is not completed (refer to a dependency "c" shown in FIG. 5), "2-2nd update information" is included in the 2-2nd update cancellation information.

The 2-2nd update cancellation information is update cancellation information used for canceling an update process of the second OS program constituting the second OS 264.

Here, the update process of the second OS is cancelled on condition that an update process of the first OS program constituting the first OS 263 or of the startup program constituting the dispatcher 267 is not completed.

In this embodiment, in a case where an update process of the second OS program is cancelled on condition that an update process of the startup program constituting the dispatcher 267 is not completed (refer to dependency "b" shown in FIG. 5), the "first update information" is included in the 2-2nd update cancellation information.

Moreover, in a case where an update process of the second OS program is cancelled on condition that an update process of the first OS program is not completed (refer to dependency "c" shown in FIG. 5), the "2-1st update information" is included in 2-2nd update cancellation information.

In a case where update cancellation information is not stored in the first OS update storage area 252, the second update agent 266 updates the first OS program by using the 2-1st update information.

In a case where update cancellation information is not stored in the second OS update storage area 253, the second update agent 266 updates the second OS program by using the 2-2nd update information.

In contrast, in a case where update cancellation information is stored in the first OS update storage area 252 or in the second OS update storage 253, the second update agent 266 cancels an update process of the first OS program or the second OS program.

(Operation of Computer)

Hereinafter, descriptions will be given of an operation of the computer 200 by referring to FIG. 6. Incidentally, shaded areas in FIG. 6 show operations different from the foregoing operations of the computer 100 in the first embodiment.

Figure 6A:
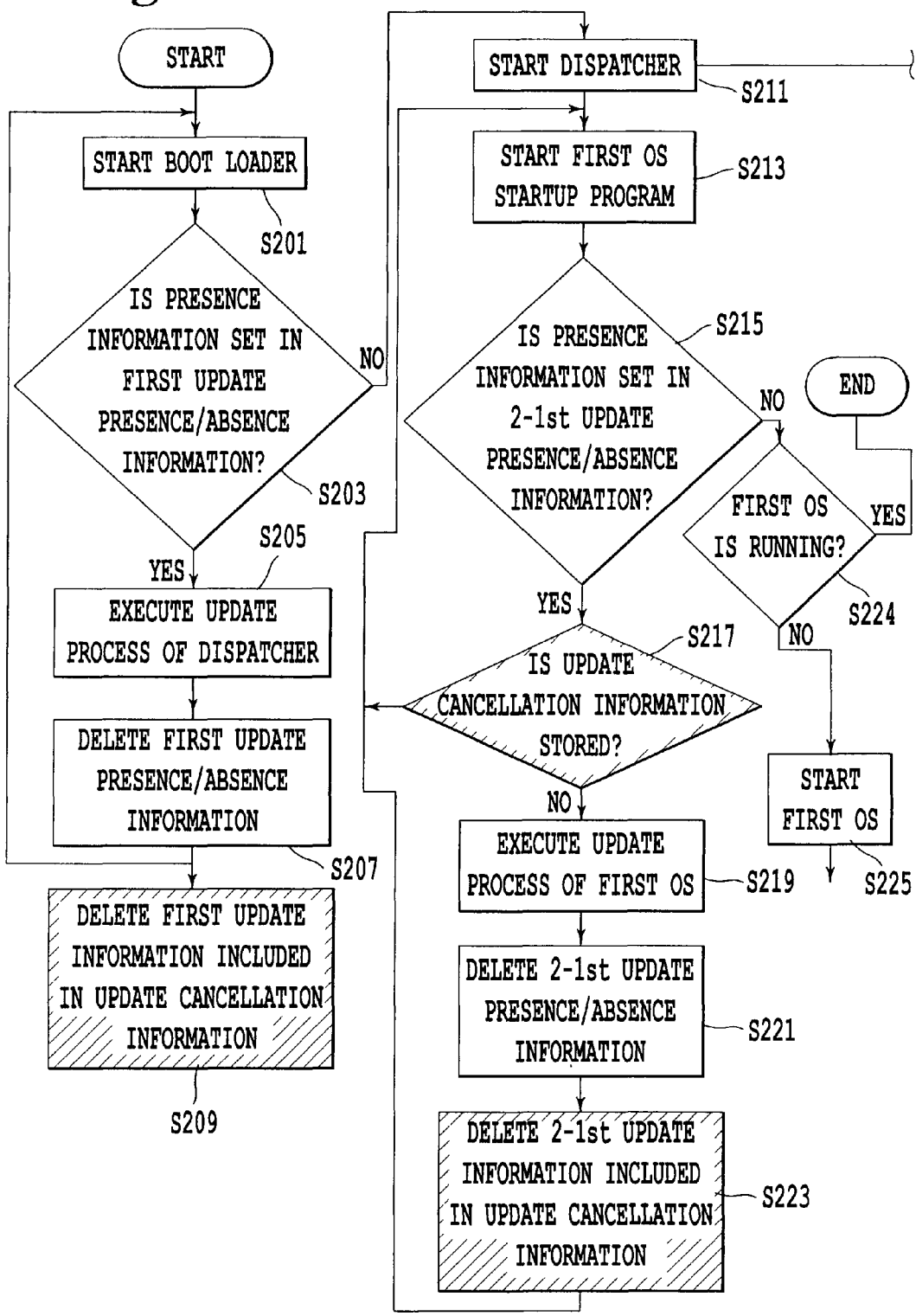
FIG. 6 is flowchart showing an operation of a computer in the second embodiment.
Figure 6B:
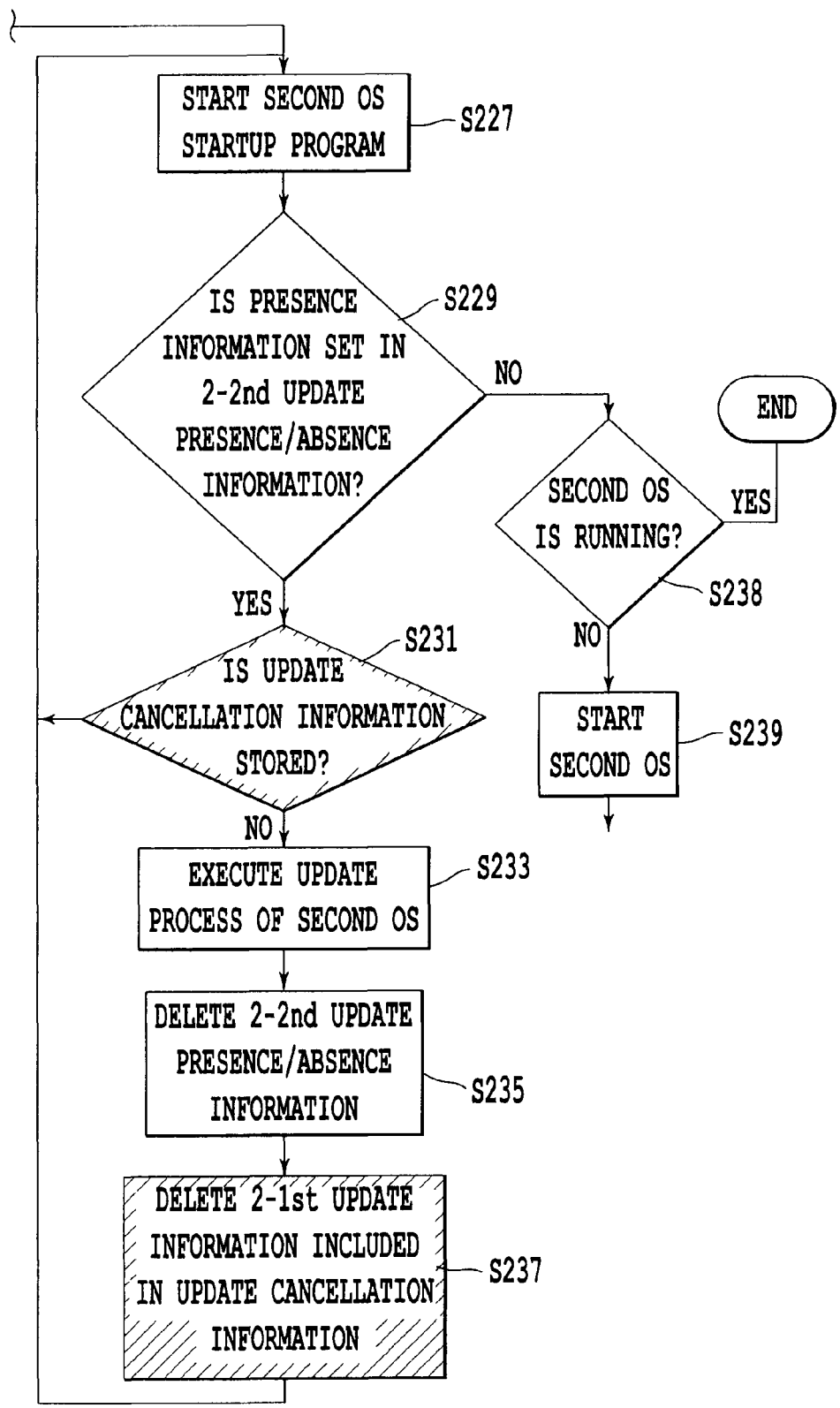

As shown in FIG. 6, in step S201, the boot loader 268 starts up at power-on or at reboot.

In step S203, the boot loader 268 determines whether or not "presence information" is included in the first update presence/absence information.

Then, if YES is determined here, the boot loader 268 starts the first update agent 265, and then the process moves to step S205. If NO is determined, the process moves to step S211.

In step S205, the first update agent 265 obtains the first update information by using address information included in first update reference information.

The first update agent 265 updates a part or the whole of the startup program constituting the dispatcher 267 to an update program included in the first update information.

In step S207, the first update agent 265 deletes the first update presence/absence information, the first update reference information and the first update information.

In step S209, the first update agent 265 deletes the first update information stored in the 2-1st update cancellation information or in the 2-2nd update cancellation information (refer to the shaded areas in FIG. 5).

In a case where no information is included in the 2-1st update cancellation information or in the 2-2nd update cancellation information after the first update information is deleted, the first update agent 265 deletes the 2-1st update cancellation information or the 2-2nd update cancellation information.

Upon completion of the process of step S209, the process from step S201 is again started. In step S203, NO is determined because the first update presence/absence information has been deleted.

In step S211, the boot loader 268 starts the dispatcher 267.

In step S213, the dispatcher 267 starts a first OS startup program 267a.

In step S215, the first OS startup program 267a determines whether or not the "presence information" is included in the 2-1st update presence/absence information.

Then, if YES is determined here, the first OS startup program 267a causes the process to move to step S217. If NO is determined, the first OS startup program 267a causes the process to move to step S224. In step S224, it is determined if the first OS is running. If the first OS is not running, in step S225, the first OS is started. If in step S224, it is determined that the first OS is running, the process ends.

In step S217, the first OS startup program 267a determines whether or not the 2-1st update cancellation information is stored.

Then, if YES is determined here, the first OS startup program 267a causes the process not to move to an update process in step S219, but to return to step S213 without causing update process in step S219 to be executed.

In contrast, if NO is determined here, the first OS startup program 267a starts the second update agent 266, and causes the process to move to step S219.

Here, if NO is determined in step S217, and if one condition is satisfied, an update process of the first OS program is executed. Here, the condition is that the 2-1st update cancellation information is deleted in the foregoing step S209 or in a later-described step S237.

In this embodiment, in a case where the first OS program executes a process using the startup program constituting the dispatcher 267, or a process using the second OS program constituting the second OS, the first update information or the 2-2nd update information is stored in the 2-1st update cancellation information.

In this case, the first OS program is updated on conditions that the startup program is updated in step S205, and that the 2-1st update cancellation information is deleted in step S209.

Alternatively, the first OS program is updated on conditions that the second OS program is updated in step S233, and that the 2-1st update cancellation information is deleted in step S237.

In step S219, the second update agent 266 obtains the 2-1st update information by using address information included in the 2-1st update reference information.

The second update agent 266 updates a part or the whole of the first OS program constituting the first OS 263 to an update program included in the 2-1st update information.

In step S221, the second update agent 266 deletes the 2-1st update presence/absence information, the 2-1st update reference information and the 2-1st update information.

In step S223, the second update agent 266 deletes the 2-1st update information stored in the 2-2nd update cancellation information (refer to the shaded area in FIG. 5).

In a case where no information is included in the 2-2nd update cancellation information after the 2-1st update information is deleted, the second update agent 266 deletes the 2-2nd update cancellation information.

Upon completion of the process of step S223, the process from S213 is again started. Then, in step S215, NO is determined because the 2-1st update presence/absence information has been deleted.

In step S225, the first OS startup program 267a executes the same process as that in the above-described step S119.

In step S227, the dispatcher 267 starts a second OS startup program 267b.

In step S229, the second OS startup program 267b determines whether or not "the presence information" is included in the 2-2nd update presence/absence information.

Then, if YES is determined here, the second OS startup program 267b causes the process to move to step S231. If NO is determined here, the second OS startup program 267b causes the process to move to step S238. In step S238, it is determined if the second OS is running. If the second OS is not running, in step S239, the second OS is started. If in step S238, it is determined that the second OS is running, the process ends.

In step S231, the second OS startup program 267b determines whether or not the 2-2nd update cancellation information is stored.

Then, if YES is determined here, the second OS startup program 267b causes the process not to move to update processing in step S233, but to return to step S227.

In contrast, if NO is determined here, the second OS startup program 267b starts the second update agent 266, and causes the process to move to step S233.

Here, if NO is determined in step S231, and if one condition is satisfied, an update process of the second OS program is executed. The condition is that the 2-2nd update cancellation information is deleted in the foregoing step S209 or step S223.

In this embodiment, in a case where the second OS program executes a process using the startup program constituting the dispatcher 267, or a process using the first OS program constituting the first OS, the first update information or the 2-1st update information is stored in the 2-2nd update cancellation information.

In this case, the second OS program is updated on conditions that the startup program is updated in step S205, and that 2-2nd update cancellation information including the first update information is deleted in step S209.

Alternatively, the second OS program is updated on conditions that the first OS program is updated in step S219, and that 2-2nd update cancellation information including the 2-1st update information is deleted in step S223.

In step S233, the second update agent 266 obtains the 2-2nd update information by using address information included in the 2-2nd update reference information.

The second update agent 266 updates a part or the whole of the second OS program constituting the second OS 264 to an update program included in the 2-2nd update information.

In step S235, the second update agent 266 deletes the 2-2nd update presence/absence information, the 2-2nd update reference information and the 2-2nd update information.

In step S237, the second update agent 266 deletes the 2-2nd update information stored in the 2-1st update cancellation information (refer to the shaded area in FIG. 5).

In a case where no information is included in the 2-1st update cancellation information after the 2-2nd update information is deleted, the second update agent 266 deletes the 2-1st update cancellation information.

Upon completion of the process of step S237, the process from step S227 is again started. In step S229, NO is determined because the 2-2nd update presence/absence information has been deleted.

In step S239, the second OS startup program 267b executes the same process as that in the above-described step S129.

Here, consider a case where a device driver (an OS program) commonly used by the first OS 263 and the second OS 264 is set up, and where the second OS 264 accesses the device driver via the first OS 263. In this case, a new device driver should be added to the first OS 263 before the new device driver is added to the second OS 264.

In this embodiment, the new device driver is firstly added to the first OS 263 by storing 2-2nd update cancellation information.

Then, the new device driver is added to the second OS 264 on condition that the 2-2nd update cancellation information is deleted.

Accordingly, while the second OS 264 executes the new device driver, the computer 200 can avoid an error that would occur due to a situation in which the device driver of the first OS 263 has not been updated.

In other words, in a case where an update process of one of the OS programs or of the startup programs is not completed, an update process of a different OS program that executes a process using the former OS program or the startup program is cancelled.

In this way, the computer 200 can avoid an error that would occur due to a situation in which the former OS program or startup program has not been updated, while the latter different OS program, which has been updated, is being executed.

Third Embodiment (Computer Configuration)

In first embodiment, one of the plurality of OS programs is started regardless of whether or not an OS program constituting another OS, or the startup program constituting the dispatcher is updated.

In contrast, in this embodiment, one of the OS programs is started on condition that an OS program constituting another OS or the startup program constituting the dispatcher has been updated. Detailed descriptions of this will be given below.

Figure 7:
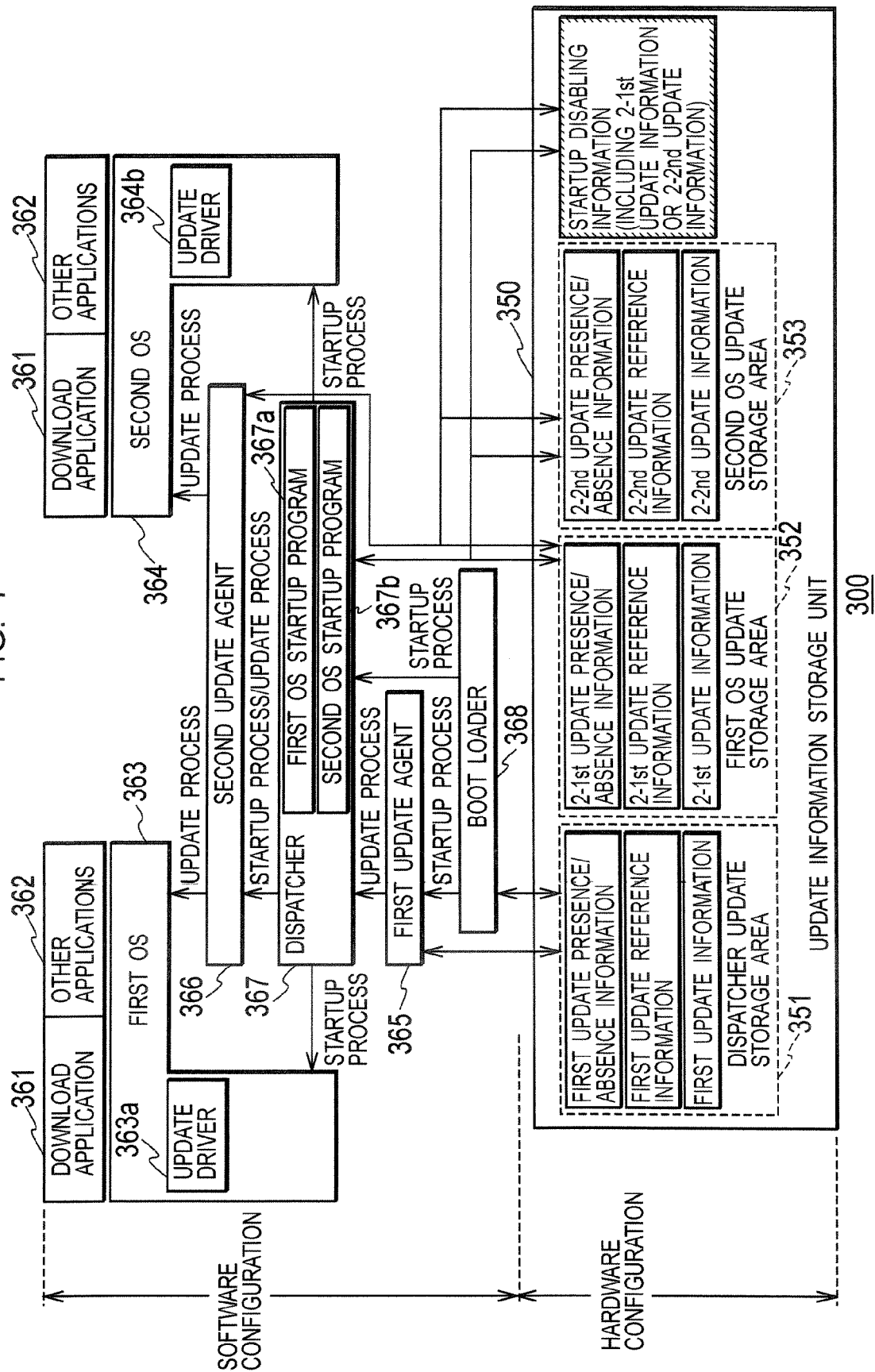
FIG. 7 is a diagram showing a control program configuration and a hardware configuration in a third embodiment.

FIG. 7 is a diagram of an internal configuration of a computer 300 in this embodiment. Shaded areas shown in FIG. 7 show components not included in the configuration shown in FIG. 3.

As shown in FIG. 7, an update information storage unit 350 is configured to further store startup disabling information. Here, functions except for that of a dispatcher 367 in FIG. 7 are substantially the same as those in FIG. 3. For this reason, the following describes only the startup disabling information and the dispatcher 367.

The startup disabling information is information used in a case where a startup process of a second OS (a second OS 364 or a first OS 363) is cancelled on condition that an update process of an OS program constituting a first OS (the first OS 363 or the second OS 364) of a plurality of OSs is not completed.

In this embodiment, in a case where a startup process of the second OS 364 is cancelled on condition that an update process of a first OS program constituting the first OS 363 is not completed, the startup disabling information includes "2-2nd update information".

In contrast, in a case where a startup process of the first OS 363 is cancelled on condition that an update process of a second OS program constituting the second OS 364 is not completed, the startup disabling information includes "2-1st update information".

The dispatcher 367 is configured to cancel a startup process of the first OS 363, if the startup disabling information includes the 2-1st update information.

In contrast, the dispatcher 367 is configured to start the first OS 363, if the startup disabling information does not include the 2-1st update information.

In addition, the dispatcher 367 is configured to cancel a startup process of the second OS 364, if startup disabling information includes the 2-2nd update information.

In contrast, the dispatcher 367 is configured to start the second OS 364, if the startup disabling information does not include the 2-2nd update information.

Incidentally, the startup disabling information may be included in the update information, the update presence/absence information, or the update reference information.

(Operation of Computer)

Figure 8A:
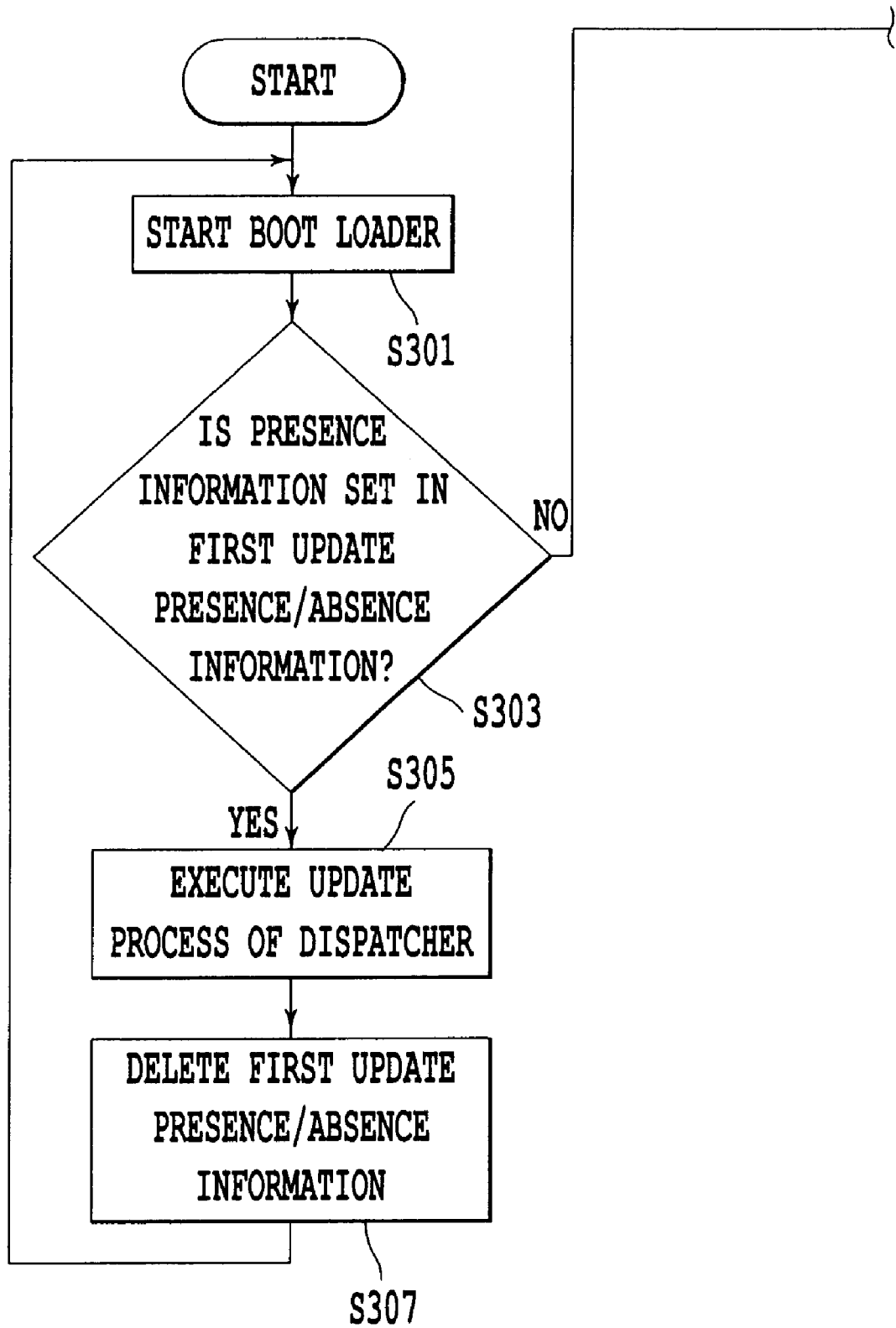
FIG. 8 is a flowchart showing an operation of a computer in the third embodiment.
Figure 8B:
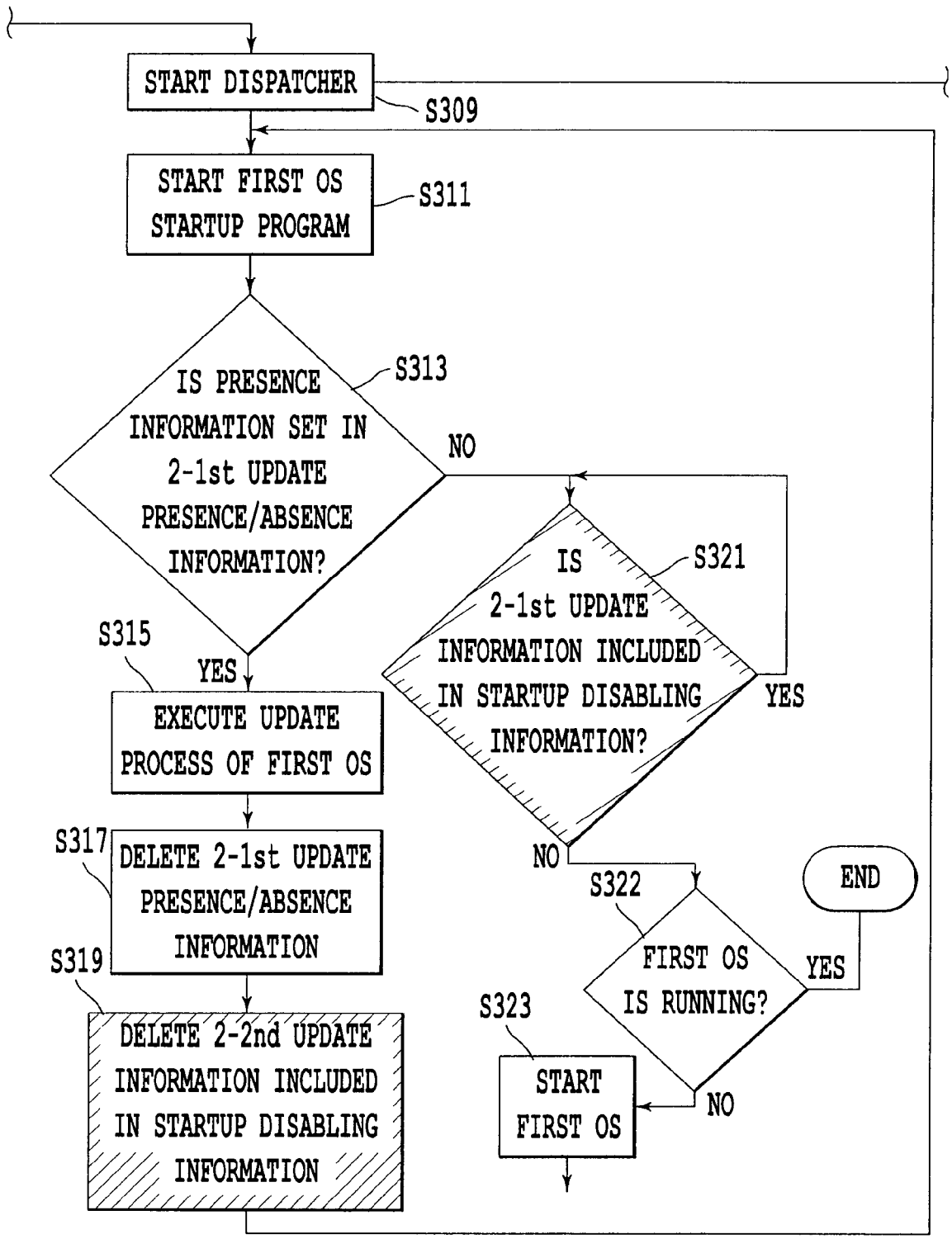
Figure 8C:
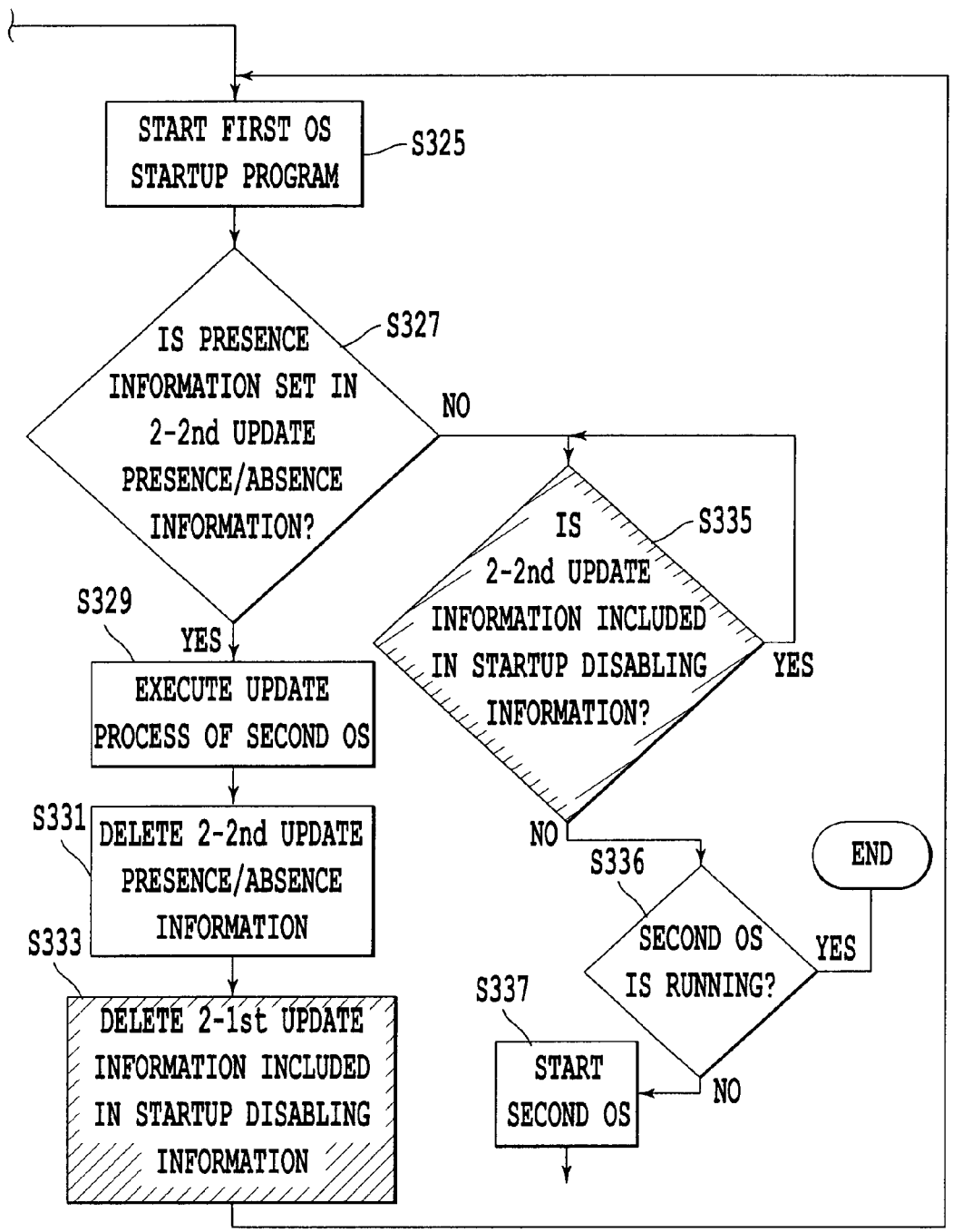
Figure 9:
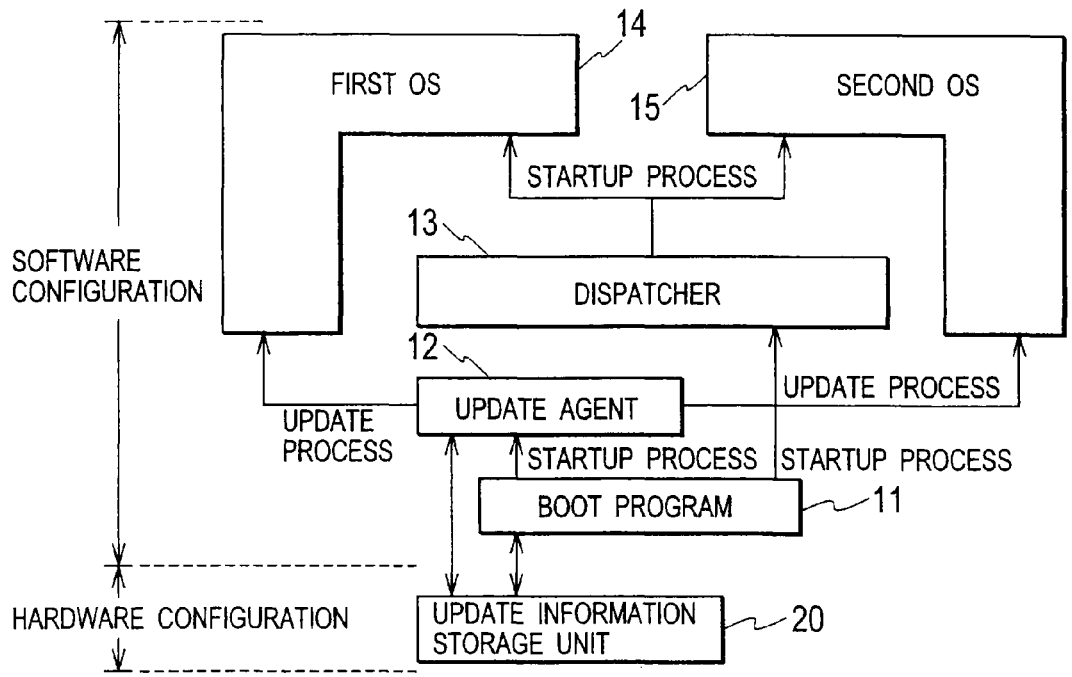
FIG. 9 is a diagram showing a software configuration and hardware configuration of a computer at the time when a combined process 1 and a combined process 2 are used.

Hereinafter, descriptions will be given of an operation of the computer 300 by referring to FIG. 8. Incidentally, shaded areas in FIG. 8 show operations different from the foregoing operations of the computer 100 in the first embodiment. Moreover, the processing flow from steps S301 to S309 is the same as that from step S101 to S109 shown in FIG. 4. For this reason, the detailed description thereof is omitted here.

In step S311, the dispatcher 367 starts a first OS startup program 367a.

In step S313, the first OS startup program 367a determines whether or not "presence information" is included in the 2-1st update presence/absence information.

Then, if YES is determined here, the first OS startup program 367a starts the second update agent 366, and causes the process to move to step S315.

If NO is determined here, the first OS startup program 367a causes the process to move to step S321.

In step S315, the second update agent 366 obtains the 2-1st update information by using address information included in the 2-1st update reference information.

The second update agent 366 updates a part or the whole of the first OS program constituting the first OS 363 to an update program included in the 2-1st update information.

In step S317, the second update agent 366 deletes the 2-1st update presence/absence information, the 2-1st update reference information and the 2-1st update information.

In step S319, the second update agent 366 deletes the 2-2nd update information included in the startup disabling information.

Upon completion of the process of step S319, the process from step S311 is again started. Then, in step S313, NO is determined because the 2-1st update presence/absence information has been deleted.

In step S321, the first OS startup program 367a determines whether or not the 2-1st update information is included in the startup disabling information.

Then, if YES is determined here, the first OS startup program 367a causes this process to be repeated. If NO is determined here, the first OS startup program 367a causes the process to move to step S322. In step S322, it is determined if the first OS is running. If the first OS is not running, in step S323, the first OS is started. If in step S322, it is determined that the first OS is running, the process ends.

In step S323, the first OS startup program 367a executes the same process as that in the above-described step S129.

Here, consider a case where only the 2-1st update information is included in the startup disabling information.

In this case, on condition that the 2-1st update information included in the startup disabling information is deleted in step S333, NO is determined in step S321, and then the first OS 363 is started in step S323.

In step S325, the dispatcher 367 starts a second OS startup program 367b.

In step S327, the second OS startup program 367b determines whether or not "presence information" is included in the 2-2nd update presence/absence information.

Then, if YES is determined here, the second OS startup program 367b starts the second update agent 366, and causes the process to move to step S329. If NO is determined, the process moves to step S335.

In step S329, the second update agent 366 obtains the 2-2nd update information by using address information included in the 2-2nd update reference information.

The second update agent 366 updates a part or the whole of the second OS program constituting the second OS 364 to an update program included in the 2-2nd update information.

In step S331, the second update agent 366 deletes the 2-2nd update presence/absence information, the 2-2nd update reference information and the 2-2nd update information.

In step S333, the second update agent 366 deletes the 2-1st update information included in the startup disabling information.

Upon completion of the process of step S333, the process from step S325 is again started. In step S327, NO is determined because the 2-2nd update presence/absence information has been deleted.

In step S335, the second OS startup program 367b determines whether or not the 2-2nd update information is included in the startup disabling information.

Then, if YES is determined here, the second OS startup program 367b causes this process to be repeated. If NO is determined here, the first OS startup program 367b causes the process to move to step S336. In step S336, it is determined if the second OS is running. If the second OS is not running, in step S337, the second OS is started. If in step S336, it is determined that the second OS is running, the process ends.

In step S337, the second OS startup program 367b executes the same process as that in the above-described step S129.

Here, consider a case where only the 2-2nd update information is included in the startup disabling information.

In this case, on condition that the 2-2nd update information included in the startup disabling information is deleted in step S319, NO is determined in step S335, and then the second OS 364 is started in step S337.

With the foregoing features, in a case where no information is stored in the startup disabling information, the first OS 363 or the second OS 364 is started.

In contrast, in a case where certain information is stored in the startup disabling information, a startup process of the first OS 363 or of the second OS 364 is cancelled.

Accordingly, in a case where an update of one of the OS programs (for example, the first OS program) is not completed, a startup process of an OS (for example, the second OS) corresponding to another OS program (for example, the second OS program) is cancelled.

In this way, the computer 300 can avoid an error that would occur due to a situation in which the former OS program has not been updated after the latter OS program is started.

In addition, in a case where it is necessary to update an OS program constituting one of the OSs that executes a more important process than another OS, certain information is stored in the startup disabling information, and thus a startup process of the latter OS is cancelled.

Accordingly, the computer 300 can execute update processes of OS programs by giving a higher priority to an OS program constituting the former OS, and can start the OSs by giving a higher priority to the former OS.

Thus, the computer 300 can avoid an error that would occur due to a situation in which an OS program of an OS executing a more important process than another OS has not been updated, after the latter OS is started.

Note that a computer in each embodiment can be applied to an electrical instrument such as a mobile phone, a PDA, a personal computer.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. An update-startup apparatus, comprising:
an OS startup processor unit configured to start a first OS and a second OS;
an initial startup processor unit configured to start the OS startup processor unit; and
an update information storage unit configured to store first OS update information for updating a first OS program constituting the first OS and second OS update information for updating a second OS program constituting the second OS; wherein,
the OS startup processor unit is configured to start the first OS after updating the first OS program by using the first OS update information, when the first OS update information is stored at a time of power-on or at a time of rebooting the first OS;
the OS startup processor unit is configured to start the first OS, when the first OS update information is not stored at a time of power-on;
the OS startup processor unit is configured to cancel a reboot of the second OS, when the second OS update information is not stored at a time of rebooting the first OS;
the update information storage unit is configured to store update cancellation information for canceling an update of the first OS program when an update of a startup program constituting the OS startup processor unit is not completed;
the OS startup processor unit is configured to update the first OS program by using the first OS update information, when the update cancellation information is not stored at the time of power-on or at the time of rebooting the first OS; and
the OS startup processor unit is configured to cancel an update of the first OS program, when the update cancellation information is stored at the time of power-on or at the time of rebooting the first OS.

2. The update-startup apparatus according to claim 1, wherein
the update information storage unit is configured to store update cancellation information for canceling an update of a second OS program when an update of the first OS program is not completed;
the OS startup processor unit is configured to update the second OS program by using the OS update information, when the update cancellation information is not stored at the time of power-on or at a time of rebooting the second OS; and
the OS startup processor unit is configured to cancel an update of the second OS program, when the update cancellation information is stored at the time of power-on or at a time of rebooting the second OS.

3. The update-startup apparatus according to claim 2, wherein
the OS startup processor unit is configured to delete the update cancellation information, when the first OS program is updated.

4. The update-startup apparatus according to claim 1, wherein,
the OS startup processor unit is configured to delete the update cancellation information, when the startup program is updated.

5. The update-startup apparatus according to claim 1, wherein
the update information storage unit is configured to store startup update information for updating a startup program constituting the OS startup processor unit;
the initial startup processor unit is configured to update the startup program by using the startup update information, when the startup update information is stored at the time of power-on or at the time of rebooting the first OS or the second OS; and
the initial startup processor unit is configured to start the OS startup processor unit, when the startup update information is not stored at the time of power-on or at the time of rebooting the first OS or the second OS.

6. An update-startup apparatus, comprising:
an OS startup processor unit configured to start a first OS and a second OS;
an initial startup processor unit configured to start the OS startup processor unit; and
an update information storage unit configured to store first OS update information for updating a first OS program constituting the first OS and second OS update information for updating a second OS program constituting the second OS; wherein,
the OS startup processor unit is configured to start the first OS after updating the first OS program by using the first OS update information, when the first OS update information is stored at a time of power-on or at a time of rebooting the first OS;
the OS startup processor unit is configured to start the first OS, when the first OS update information is not stored at a time of power-on;
the OS startup processor unit is configured to cancel a reboot of the second OS, when the second OS update information is not stored at a time of rebooting the first OS;
the update information storage unit is configured to store startup update information for updating a startup program constituting the OS startup processor unit;
the initial startup processor unit is configured to update the startup program by using the startup update information, when the startup update information is stored at the time of power-on or at the time of rebooting the first OS or the second OS;
the initial startup processor unit is configured to start the OS startup processor unit, when the startup update information is not stored at the time of power-on or at the time of rebooting the first OS or the second OS;
the update information storage unit is configured to store startup disabling information for canceling a startup of the second OS when an update of the first OS program is not completed;
the OS startup processor unit is configured to start the second OS, when the startup disabling information is not stored at the time of power-on or at a time of the second OS; and
the OS startup processor unit is configured to cancel a startup of the second OS, when the startup disabling information is stored at the time of power-on or before the second OS is rebooted.

7. The update-startup apparatus according to claim 6, wherein,
the OS startup processor unit is configured to delete the startup disabling information, when the first OS program is updated.

8. The update-startup apparatus according to claim 1 or claim 6, wherein the update information storage unit contains two separate storage areas.

9. An update-startup control method, comprising:
(A) starting a first OS and a second OS;
(B) starting the step (A); and
(C) storing first OS update information for updating a first OS program constituting the first OS and second OS update information for updating a second OS program constituting the second OS; wherein
in the step (A), the first OS is started after the first OS program is updated by using the first OS update information, when the first OS update information is stored at a time of power-on or at a time of rebooting the first OS;
in the step (A), the first OS is started, when the first OS update information is not stored at a time of power-on;
in the step (A), a reboot of the second OS is cancelled, when the second OS update information is not stored at a time of rebooting the first OS;
storing update cancellation information for canceling an update of the first OS program when an update of a startup program is not completed;
updating the first OS program by using the first OS update information, when the update cancellation information is not stored at the time of power-on or at the time of rebooting the first OS; and
canceling an update of the first OS program, when the update cancellation information is stored at the time of power-on or at the time of rebooting the first OS.

10. An update-startup control method, comprising:
(A) starting a first OS and a second OS;
(B) starting the step (A); and
(C) storing first OS update information for updating a first OS program constituting the first OS and second OS update information for updating a second OS program constituting the second OS; wherein
in the step (A), the first OS is started after the first OS program is updated by using the first OS update information, when the first OS update information is stored at a time of power-on or at a time of rebooting the first OS;
in the step (A), the first OS is started, when the first OS update information is not stored at a time of power-on;
in the step (A), a reboot of the second OS is cancelled, when the second OS update information is not stored at a time of rebooting the first OS;
storing startup update information for updating a startup program constituting an OS startup processor unit;
updating the startup program by using the startup update information, when the startup update information is stored at the time of power-on or at the time of rebooting the first OS or the second OS;
starting the OS startup processor unit, when the startup update information is not stored at the time of power-on or at the time of rebooting the first OS or the second OS;
storing startup disabling information for canceling a startup of the second OS when an update of the first OS program is not completed;
starting the second OS, when the startup disabling information is not stored at the time of power-on or at a time of the second OS; and
canceling a startup of the second OS, when the startup disabling information is stored at the time of power-on or before the second OS is rebooted.

* * * * *